APPARATUS FOR COMPENSATING FOR MAGNETIC TAPE SPEED
VARIATIONS DURING PLAYBACK
Filed June 22, 1959
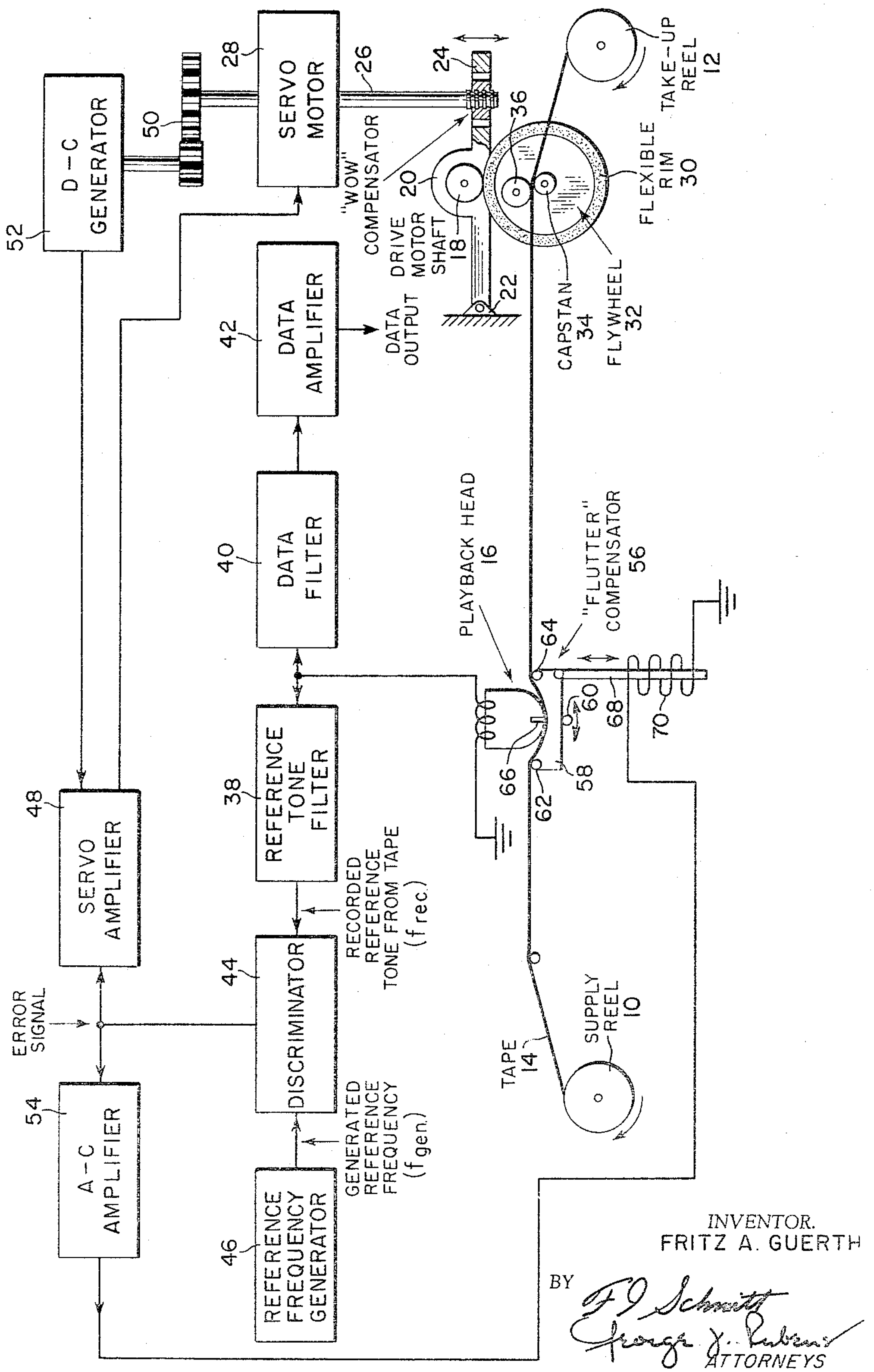
INVENTOR.
FRITZ A. GUERTH
BY F. J. Schmitt
George J. Rubens
ATTORNEYS 3,306,987

APPARATUS FOR COMPENSATING FOR MAGNETIC TAPE SPEED VARIATIONS DURING PLAYBACK

Fritz A. Guerth, Camarillo, Calif., assignor to the United States of America as represented by the Secretary of the Navy Filed June 22, 1959, Ser. No. 822,168
2 Claims. (Cl. 179—100.2)

The invention described herein may be manufactured and used by or for the Government of the United States of America for governmental purposes without the payment of any royalties thereon or therefor.

The present invention relates in general to the reproduction of intelligence which has been electromagnetically recorded on some movable storage medium such as a sensitized tape. In particular, it relates to means for compensating for undesired variations in the effective reproduction speed of the storage medium as compared to the speed at which the intelligence was recorded thereon.

When data is telemetered from a remote point for local recordation and subsequent reproduction, it is customary to frequency-modulate a plurality of sub-carriers corresponding in number to the number of channels of information to be recorded. Each such channel of telemetered data is represented by deviations in its respective sub-carrier from a predetermined center frequency, and the magnitude of this deviation, when recorded, is a direct function of the speed of movement of the storage medium. It will thus be apparent that unless reproduction speed is precisely synchronized with recording speed throughout the playback interval, significant errors will be introduced into the data made available for study and/or analysis.

Distortion of the above nature falls into fairly well-defined categories. Differences in tape speed which do not exceed one-tenth cycle per second are termed "drift"; those ranging from this point up to approximately 20 c.p.s. are known as "wow"; and higher-frequency variations are given the name "flutter." Many attempts have been made to control the relatively lower-frequency forms of distortion, such as by voltage-regulating circuits in the driving motor power supply, mechanical governors, large fly wheels with high inertia, etc. Some of these expedients have been partially successful, but only at considerable expense and by greatly increasing the complexity of the reproducing apparatus. In the case of flutter, the difficulty is enhanced by its oscillatory or vibratory character. It has heretofore been deemed necessary to attack this problem by purely electronic means, as for example by the feeding back of a phase-inverted flutter component into the detected signal to neutralize the unwanted distortion. This system, however, is not free from transients which are generated whenever the flutter frequency undergoes sharp changes, and these transients will be reproduced differently by each channel insofar as phase is concerned. Consequently complex phase-correction networks are required in order to obtain a satisfactory output signal.

The present invention has as one of its objectives the compensation of tape-speed irregularities by electromechanical means of unusual simplicity. In brief, the concept includes the recordation on the storage medium of a reference tone of predetermined frequency. During playback, the reference tone is separated from the intelligence signal and fed to a discriminator which also receives a precision wave of identical frequency from a local generator. Any phase deviations produce an error voltage the lower-frequency components of which effect a "wow" control of the tape movement directly through regulation of capstan speed. The higher-frequency components of the error voltage energize a flutter compensator which is an oscillatable frame mounted adjacent the playback head. When vibrated at flutter frequency, this frame alternately superimposes a fine or vernier movement on the tape in such phase as to cancel the undesired flutter without requiring any variation in basic tape speed as determined by capstan rotation.

One object of the present invention, therefore, is to provide an improved system for the reproduction of recorded intelligence.

Another object of the invention is to provide reproducing apparatus of the type described which is essentially free from undesired variations in reproducing speed of the storage medium as compared to the speed at which the intelligence was recorded thereon.

A further object of the invention is to compensate for "wow" and "flutter" in data playback apparatus, this compensation being achieved by electromechanical means of unusual simplicity.

Other objects and many of the attendant advantages of this invention will be readily appreciated as the same becomes better understood by reference to the following detailed description when considered in connection with the accompanying drawing, the single figure of which is a schematic representation of one form of electromagnetic data reproducer incorporating the principles of the present invention.

It will be understood that the concept herein disclosed is applicable to many different types of playback units, and especially to those utilizing sensitized tape as a storage medium. Certain of these reproducers incorporate more or less standard components such as erasure devices, tape guides, power supply regulators, etc. which form no part of the present invention and hence have been omitted from the drawing for the sake of simplicity of illustration.

Some conventional elements which are shown, however, include a supply reel 10 and a take-up reel 12, which operate in the usual fashion to preserve a constant tension in a sensitized tape 14. The latter is caused to pass by a playback head 16 as a result of over-all motion imparted thereto by a drive motor (not shown) having a shaft 18. This shaft 18 is mounted in a frame 20 which is hinged at 22 to some rigid structure of the assembly. Extending outwardly from that portion of the frame enclosing the motor shaft 18 is an arm 24 adapted to engage a worm shaft 26 forming part of a servo motor 28, the function of which will hereinafter be described. It will suffice at this point to state that rotation of servo motor output shaft 26 will cause arm 24 (and hence the drive motor shaft 18 carried by frame 20) to pivot about point 22 in one of the directions indicated by the arrows. It will be understood that suitable bearings may be incorporated in the arm 24 at the point where the worm shaft 26 passes therethrough.

Drive motor shaft 18 frictionally engages the flexible rim 30 of a flywheel 32 having a shaft supporting a conventional capstan 34. The tape 14 passes between capstan 34 and a pressure idler 36 in a manner well known in the art.

The rim 30 of flywheel 32 is composed of some deformable material such, for example, as foam rubber, provided with a flexible skin or cover which nevertheless is not appreciably subject to stretching. Consequently, a downward (withdrawing) angular movement of the frame or housing 20 about point 22 will cause the surface of drive motor shaft 18 to compress the flexible material of rim 30 and bring the axis of shaft 18 closer to that of capstan 34. Contrary to what might first be expected, such an inward movement of shaft 18 relative to capstan 34 will decrease the speed of movement of tape 14 rather than increase such speed, since the outer circumference of the rim 30 is effectively made greater when the shaft 18 presses into the flexible material of which the rim is composed. The result is that the motor shaft 18 must undergo a greater angular rotation for a given movement of the capstan, or, expressed differently, the capstan rotates more slowly for a given drive motor speed.

In addition to the intelligence which it is desired to reproduce, tape 14 has recorded thereon a precision reference tone, which, in the case of a tape speed of 60"/sec., may be 4 kc. This tone is preferably recorded simultaneously with the received data, and is utilized for correcting undesired tape speed variations in the reproducer in a manner now to be described.

The system of the drawing includes the standard playback head 16 which derives from the electromagnetic impressions on tape 14 a varying electrical voltage. The voltage so derived is fed to two filters 38 and 40, the former separating out the 4 kc. reference tone ($f_{rec.}$) which was impressed on tape 14 during recording, and the latter separating out the data or intelligence. After being amplified at 42, such data is available for direct utilization or any further processing which may be desired.

The reference tone derived from filter 38 is applied to a discriminator 44. The latter also receives the output of a reference frequency generator 46 which is arranged to develop a wave ($f_{gen.}$) equal in frequency to that of the wave impressed on tape 14 during recording, this frequency in the example given being 4 kc. Discriminator 44 compares the two waves thus applied thereto.

Since these two waves $f_{rec.}$ and $f_{gen.}$ are of identical frequency, it will be appreciated that no output will be produced by the discriminator 44 when the tape 14 is moving past the playback head 16 at a speed which is the same as that at which it moved during recording. If the tape reproduction speed departs from this condition, however, an error voltage will be developed by the discriminator the magnitude of which will be dependent upon the phase angle between $f_{rec.}$ and $f_{gen.}$, or, in other words, the error voltage will have a value proportional to the amount by which the reproduction tape speed differs from the recording tape speed. This phase error voltage in accordance with the present invention is separately utilized for both "wow" and "flutter" control of tape 14.

For slowly-varying tape speed irregularities, the error signal output of discriminator 44 is applied to a servo amplifier unit 48 which utilizes only the lower-frequency or D.C. components of the error signal. Servo amplifier 48 energizes the servo motor 28 to rotate shaft 26 and cause the drive motor shaft housing 20 to pivot about point 22 in a direction, and by an amount, dependent upon the direction and extent of servo motor operation. The latter is geared at 50 to drive a D.-C. generator 52 the output of which is fed back to the servo amplifier 48 in such polarity as to oppose the voltage supplied to motor 28 and thus have a restrictive or damping effect on servo motor operation to preclude "hunting" thereof. Damping arrangements of such nature are well known in the art to which this disclosure pertains. As previously described, movement of the drive motor shaft 18 into and out of the flexible material of which the flywheel rim 30 is composed has the effect of varying the speed at which tape 14 moves through the capstan-idler unit 34–36. Low-frequency, or "wow," control of tape 14 is thus accomplished.

For rapidly-varying tape speed irregularities of an oscillatory nature, the error signal output of discriminator 44 passes through an A.-C. amplifier and to a "flutter compensator" assembly generally identified in the drawing by the reference numeral 56. This assembly consists of a tape-carrying frame 58 which is pivoted for limited rotation in either direction about an axis 60 lying perpendicular to the plane of the paper, as indicated by the arrows. Tape 14 passes over two rollers 62 and 64 respectively located at opposite ends of the frame, the latter being of concave configuration between such ends to accommodate the playback head 16. The gap 66 of the head is centrally disposed with respect to the frame so as to approximately coincide (in the direction of tape movement) with the pivot point 60. The surface of the playback head in the vicinity of the gap 66 is separated from the surface of the frame 58 only by the width of tape 14, so that the latter is maintained in constant contact with the playback head during rotational movement of the frame about its pivot point 60.

The frame 58 has pivotally attached to one end thereof a vertically-positioned (in the drawing) rod 68 which forms the armature of a solenoid having a coil 70 through which passes the output of A.-C. amplifier 54. It will now be seen that variations in this output will develop a varying electromagnetic field around coil 70 to move the rod 68 in the direction of the arrows and thereby impart an oscillatory or rocking motion to the frame 58 about point 60.

Inasmuch as tape 14 is maintained under a predetermined degree of tension during the play-back operation, a movement of frame 58 about its pivot point will have the effect of superimposing upon basic tape movement (as determined by the speed of rotation of capstan 34) a further movement created by alternate increases and decreases in the size of the tape loops formed by the rollers 62, 64 and the concave upper surface of frame 58. With tape movement as shown by the arrows in the drawing, a rocking motion of frame 58 about point 60 so as to raise the roller 64 and lower the roller 62 will effectively increase the speed of the tape as seen by the gap 66 in playback head 16. Conversely, a motion of the frame which lowers the roller 64 and raises the roller 62 creates a slack ahead of the gap 66, which must be taken up before the tape can resume passage by gap 66 at normal velocity. Rapid oscillations of the frame 58 at "flutter" frequency thus do not cause any change in basic tape movement but only affect such movement in the immediate vicinity of the playback head 16. With the rate at which the flutter compensator 56 operates being determined by the error signal output of discriminator 44, substantially complete cancellation of high-frequency tape movement irregularities is brought about.

Since the flutter compensator 56 only effects a vernier control over tape movement, it is necessary that the basic tape speed be properly synchronized by operation of the servo motor 28 and its related apparatus before flutter compensation can take place. This basic synchronization, or phase "lock-in," occurs whenever the output of discriminator 44 contains a suitable D.-C. component. However, when the system is first placed in operation and the tape is either not moving or else moving at an extremely slow speed, there will be no D.-C. output from amplifier 48 and hence no synchronization.

This is because the flutter compensator 56 is not active under such conditions, and hence does not develop an output which can be rectified for application to the servo motor. As the correct tape speed is approached, however, oscillation of the flutter compensator frame 58 is effective to superimpose a frequency modulation on the over-all tape movement. This modulation is of such a nature that the output waveform from the discriminator 44 is no longer of sine-wave configuration, but is instead biased in one excursion of polarity, the direction of this excursion being determined by whether the tape speed is above or below that at which the signal was recorded. This unbalanced wave is readily rectified or otherwise converted by the servo amplifier 48 into a control voltage for regulation of motor 28 whereby the entire system is "locked-in," or effectively synchronized insofar as the basic movement of tape 14 is concerned. It should be noted that the D.-C. energy obtained by such rectification is proportional to the beat frequency between the locally-generated reference signal and the reference tone derived from the tape, but that this relationship is not linear throughout but instead levels off over the latter portion of the range. Hence, over this level section of the characteristic, changes in beat frequency develop essentially no error voltage, and the frequency difference must be reduced to a point where sufficient error voltage is developed for the system to lock-in. This occurs on the steeply rising initial portion of the characteristic.

It is not necessary that the frame 56 undergo an oscillatory movement of any considerable magnitude. For example, it has been found in practice that a frame movement which can produce a maximum tape displacement of only ±.003 inch is sufficient to reduce flutter distortion to 10% of its original value. In spite of this small displacement, however, the relatively high oscillation frequency dictates a frame having small inertia and low mass, and hence light-weight materials should preferably be used in its construction.

Obviously many modifications and variations of the present invention are possible in the light of the above teachings. It is therefore to be understood that within the scope of the appended claims the invention may be practiced otherwise than as specifically described.

I claim:

1. Apparatus for reproducing data from a movable storage medium on which has been recorded a timing signal of predetermined frequency, said apparatus comprising: means for imparting an over-all movement to said storage medium; means, including a playback head, for reproducing from said storage medium the timing signal recorded thereon; means for generating a reference signal of a frequency identical to that of said timing signal; means for comparing the reference signal so generated with the timing signal reproduced from said storage medium to develop a fluctuating error voltage the magnitude of which is indicative of the extent of any variation in the speed of movement of said storage medium during reproduction from its speed of movement during the recording of said timing signal thereon; and means for applying a characteristic of said error voltage to control the movement of said storage medium only in the immediate vicinity of said playback head, said last-mentioned means including a frame formed with a re-entrant portion and having mounted thereon a pair of spaced-apart rollers over which said storage medium successively passes, said playback head being disposed at least partially within the re-entrant portion of said frame so that said storage medium describes a loop in moving past said head, said frame being pivotally mounted for limited angular rotation about a single axis lying intermediate said rollers insofar as the over-all direction of movement of said storage medium is concerned, said axis being equidistant from said rollers, said axis also extending essentially transverse to the direction of movement of said medium past said playback head.

2. Apparatus in accordance with claim 1, further including means for imparting a limited oscillatory motion to said frame so that the two rollers of said pair move oppositely in directions essentially normal to the general direction of movement of said storage medium, a particular movement of said frame resulting in an increase in contacting pressure between one of said rollers and said storage medium and a decrease in contacting pressure between the remaining roller and said storage medium, thereby to respectively increase and decrease the tension in said medium at a point just prior to its passage by said head so as to effectively and correspondingly increase and decrease the velocity of said medium in the vicinity of said head with respect to its over-all movement.

References Cited by the Examiner

UNITED STATES PATENTS

| | | | |
|---|---|---|---|
| 2,656,419 | 10/1953 | Dingley | 340—174 X |
| 2,681,387 | 6/1954 | Roys | 340—174 X |
| 2,714,202 | 7/1955 | Downing | 340—174 |
| 2,751,439 | 6/1956 | Burton | 340—174 X |
| 2,797,378 | 6/1957 | Johnson | 340—174 X |
| 2,839,615 | 6/1958 | Sarratt | 340—174 X |
| 2,892,022 | 6/1959 | Houghton | 340—174 X |
| 2,963,555 | 12/1960 | Brubaker | 179—100.2 |
| 2,977,422 | 3/1961 | Pear | 179—100.2 |

BERNARD KONICK, *Primary Examiner.*

EVERETT R. REYNOLDS, IRVING L. SRAGOW, NEWTON N. LOVEWELL, *Examiners.*

V. P. VANDENBURG, K. E. JACOBS, D. G. REDINBAUGH, A. I. NEUSTADT, *Assistant Examiners.*